United States Patent [19]

Onozato

[11] Patent Number: 5,197,198
[45] Date of Patent: Mar. 30, 1993

[54] ANGULAR INITIALIZATION METHOD FOR ORIENTATING A CUTTING EDGE PORTION IN A CUTTING PLOTTER

[75] Inventor: Takashi Onozato, Morioka, Japan

[73] Assignee: Alps Electric Co., Ltd., Tokyo, Japan

[21] Appl. No.: 774,670

[22] Filed: Oct. 11, 1991

[30] Foreign Application Priority Data

Oct. 31, 1990 [JP] Japan .................. 2-294350

[51] Int. Cl.$^5$ .................. B43L 13/00; B26D 5/00
[52] U.S. Cl. .................. 33/18.1; 33/1 M; 33/32.3; 83/34
[58] Field of Search .................. 33/18.1, 1 M, 32.1, 33/32.3, 32.4; 83/939, 76.6, 34

[56] References Cited

U.S. PATENT DOCUMENTS

| | | | |
|---|---|---|---|
| 4,133,233 | 1/1979 | Pearl | 83/76.6 |
| 4,624,169 | 11/1986 | Nelson | 33/1 N |
| 5,042,339 | 8/1991 | Gerber | 83/76.6 |
| 5,094,134 | 3/1992 | Mizukoshi | 33/18.1 |

FOREIGN PATENT DOCUMENTS

1183397 7/1989 Japan .
2075407 11/1981 United Kingdom .................. 83/34

Primary Examiner—William A. Cuchlinski, Jr.
Assistant Examiner—Alvin Wirthlin
Attorney, Agent, or Firm—Guy W. Shoup; Patrick T. Bever

[57] ABSTRACT

The present invention relates to an angular initialization method for orientating a direction of a cutting edge portion in a cutting plotter which cuts out a cutting medium into a desired shape sheet, in which a cutter member is continuously shifted to cut out the cutting medium along two line segments from a first line segment to a second line segment which intersect with each other at a predetermined angle, and it is possible, when the cutter member is shifting on the second line segment, to change the direction of the cutting edge portion and to securely locate the direction of the cutting edge portion to coincide with the second line segment shortly before a cutting operation is commenced, even if the cutter member is not turned to a desired cutting direction while the cutter member has been shifting on the first line segment.

4 Claims, 5 Drawing Sheets

ANGULAR INITIALIZATION METHOD FOR ORIENTATING A CUTTING EDGE PORTION IN A CUTTING PLOTTER

BACKGROUND OF THE INVENTION

(1) Field of the Invention

The present invention relates to a cutting plotter for producing a predetermined shape from a sheet-shaped cutting medium such as a paper, a marking film, and so on, which are used, for example, for an outdoor signboard or a decoration of a windshield glass or a show window, and more particularly, to an angular initialization method for orientating a cutting edge portion in a cutting plotter wherein a direction of an edge portion of a cutter main body can be located to point in a predetermined direction shortly before a cutting operation is commenced.

(2) Description of the Related Art

In such a kind of cutting plotter as described above, it is generally known that a host computer feeds various cutting data, including information required for a cutting operation, and a cutter member is shifted in an X direction or a Y direction in an X-Y coordinates which are defined in a mutual relationship with a cutting medium, and as a result, the cutting medium is cut out in a predetermined shape. In the beginning of the cutting operation, the cutter member is located at a position which corresponds to a starting point of a preselected shape to be cut in the cutting operation, based on the cutting data fed from the host computer. Then the cutter member is lowered in order to commence the cutting operation, and the cutting operation is performed in such a manner that the cutting member moves along the shape preselected by the host computer. Then, at the end of the cutting operation, the cutter member is raised upward so as to depart from the ending point of the shape to be cut out, and thus, one cycle of the cutting operation is completed. Normally, such a cutting operation is repeated in the same cutting medium, therefore, a plurality of shapes, such as letters or figures are obtained from the single cutting medium.

The cutter member has a column-shaped cutter supported so as to be able to rotate freely, and there is provided a cutting edge portion at the lower end of the outer surface of the cutter. The cutting edge portion is formed to have an inclined cutting edge surface, and there is provided a pointed end at the front end of the cutting edge portion. The pointed end of the cutting edge portion is formed to be offset from a rotational axis of the cutter. This is for causing a rotational moment which is transferred from the cutting medium to the cutter through the pointed end of the cutting edge portion, and such a rotational moment is caused based on the offset arrangement of the pointed end from the cutting edge portion. Therefore, the cutting edge portion of the cutter is designed to be always likely to point in the cutting direction. Such a construction is known to the public, as shown in the Japanese Utility Model 49-19322.

However, due to the nature of the cutter which is freely rotatable as described in the foregoing description, is not always desirable to accurately control the direction of the cutting edge portion so as to coincide with the predetermined cutting direction.

For this reason, generally, at the end of the cutting operation this has been utilized to detect an angular dislocation of the cutting edge portion, with respect to the rotational axis of the cutter main body. These detected angular dislocations are memorized into a RAM (Random Access Memory) so as to renew the previous data by the latest data upon receiving each detected data. This is because the cutting edge portion is placed to point accurately to the cutting direction; i.e. the direction of a last part of line segment of the predetermined shape to be cut out, at the end of the cutting operation. The memorized angular dislocation data is utilized to calculate the direction of the cutting edge portion and to control the cutting edge portion in the next cutting operation.

However, when the cutting plotter itself is turned on or when the cutting plotter is in a brand-new condition, an operation is thus carried out for the first time, it should be noted that there is no information available at that time, since no data is memorized as cutting data of the previous cutting operation. Accordingly, it was necessary to perform an angular initialization for orientating the direction of the cutting edge portion of the cutter to point the predetermined direction by using any effective method.

Various methods are proposed, conventionally, such as angular initialization methods for the cutting edge portion. The one shown in FIG. 5 is the method which does not require any particular device to be newly added.

The angular initialization in the method shown in FIG. 5 is carried out in such a manner that, in the case that a cutting medium 1 is cut out by a cutter 30, that when a cutting operation is started from a starting point A toward a corner point B, an actual cutting operation is commenced from the other point A' which is located to be spaced out from the point A in the opposite direction of point B. The initial cutting operation is carried out in such a manner that the cutter 30 shifts from the point A' to the point A along a straight line which is indicated as a broken line in the drawing. Since the pointed end of the cutting edge portion of the cutter 30 is supported to be freely rotatable around the rotational axis, and is offset from the rotational axis, a locus of the pointed end of the cutting edge portion is depicted as is shown by a solid line in the drawing. That is, the direction of the cutting edge portion is gradually changed to coincide the same direction as a line segment AB. Thus, the direction of the cutting edge portion is located to point in a predetermined direction shortly before the cutter 30 reaches the point A.

In such a conventional method, it might be no problem if an angular dislocation of a cutter 30 with respect to the line segment AB is small. However, in the case that the angular dislocation becomes large so as to approach to approximately 180 degree, that is, if the direction of the cutting edge portion is located to point in the exactly opposite direction against the cutting direction at the beginning of the cutting operation, the rotational moment, which should be caused around the rotational axis of the cutter 30 due to the offset arrangement of the pointed end, is suppressed because a resistance force loaded from the cutting medium to the cutter 30 becomes large enough to cancel this rotational moment.

SUMMARY OF THE INVENTION

It is therefore an object of the present invention to overcome the problem encountered by the foregoing conventional method and to provide an angular initialization method for orientating a direction of a cutting edge portion in a cutting plotter which enables it possible to accurately locate the cutting edge portion to point a predetermined desirable direction in any event shortly before a cutting operation of a predetermined shape on a cutting medium commences.

The other object of the present invention is to provide an angular initialization method for orientating a direction of a cutting edge portion in a cutting plotter wherein a cutter member, which includes a cutter with a cutting edge portion supported to be freely rotatable and a pointed end thereof is disposed offset from a rotational axis of the cutter, is shifted along an X-direction or a Y-direction in -X-Y-coordinates defined in a mutual relationship with respect to a cutting medium so as to cut out a desired shape from the cutting medium, the method comprises steps of setting two different line segments, which is connected to intersect with each other at a predetermined angle and are located out of the desired shape on the cutting medium, and shifting the cutter member along these two line segments to cut out the cutting medium, thereby initializing a direction of the cutting edge portion to coincide with a predetermined direction which is desirable for a cutting operation.

In accordance with the present invention which is constituted as described in the foregoing description, the cutter member is shifted along the two line segments which are connected to intersect at a predetermined angle to cut out a cutting medium. In this operation, even if the cutter member did not change its direction toward a correct direction by the rotational moment which is caused due to the offset arrangement of the pointed end of the cutting edge portion when the cutter member is shifting on a first line segment, the cutter member can be securely rotated to the correct direction when the cutter member is shifting on a second line segment because the cutting edge portion is turned in accordance with the shift movement from the first line segment to the second line segment.

The above, and other objects, features and advantages of the present invention will become apparent from the following detail description which is to be read in conjunction with the accompanying drawings.

BRIEF DESCRIPTION OF THE ACCOMPANYING DRAWINGS

FIG. 1 is a perspective view showing an operation of an angular initialization method for orientating a direction of a cutting edge portion in a cutting plotter in accordance with the present invention;

FIGS. 2(A) and (B) are respectively an upper perspective view and a lower perspective view showing an essential portion of the cutting plotter in FIG. 1;

DETAIL DESCRIPTION OF THE PREFERRED EMBODIMENT

Figure 2A:
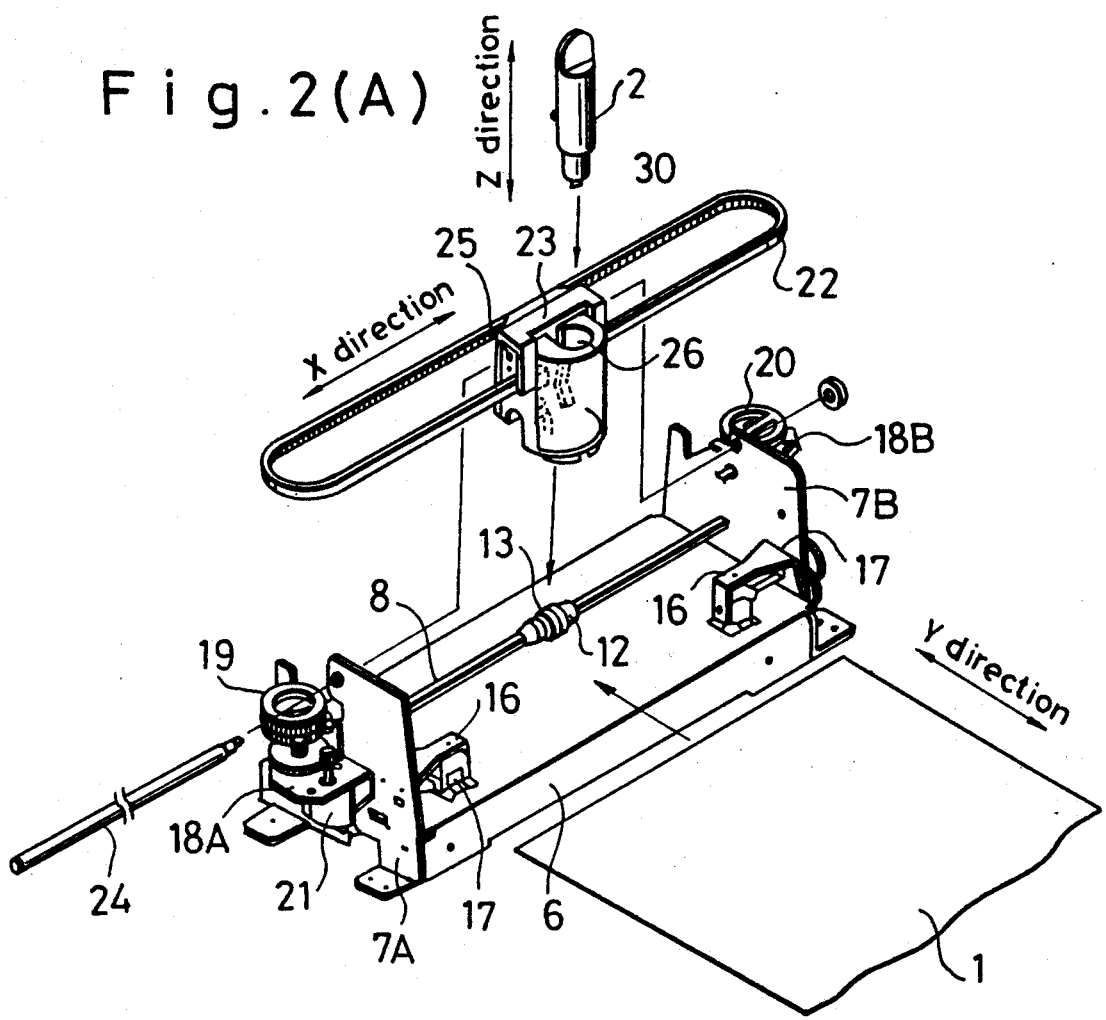

Hereinafter, referring now to the drawings, the embodiment of the present invention is explained in detail. FIGS. 2(A) and (B) show essential structures of a cutting plotter which adopts an angular initialization method for orientating a direction of a cutting edge portion in accordance with the present invention. Reference numeral 6 denotes a base, and there are provided a pair of side plates 7A, 7B at both ends of the base 6. These side plates 7A and 7B are disposed to stand vertically from the base 6. Between these side plates 7A and 7B, there is provided a rotational shaft 8, which is disposed to face an upper surface of the base 6, and a rotational shaft 9 which is located under the base 6. The rotational shaft 8 has a square cross section, and the rotational shaft 9 has a circular cross section. Both of these rotational shafts 8 and 9 are supported to be freely rotatable between the side plates 7A and 7B. The rotational shaft 8 and the rotational shaft 9 are driven by the driving motor 10 and the driving motor 11, respectively. These driving motors 10 and 11 are installed on the side plate 7B.

On the rotational shaft 8, there is provided a sleeve 12 which is coupled with the rotational shaft 8. The sleeve 12 is shiftable in a direction of an axis of the rotational shaft 8 and is rotatable integrally with this rotational shaft 8. On the sleeve 12, there is formed a worm gear 13. On the rotational shaft 9, there is provided a pair of paper feeding rollers 14. These paper feeding rollers 14 are disposed to be spaced with respect to each other along the axis of the rotational shaft 9, and are coupled with the rotational shaft 9 so as to be rotatable integrally with this rotational shaft 9. Each of these paper feeding rollers 14, is disposed to protrude above the base 6. On the base plate 6, there is provided a pair of window holes 15, and each of the paper feeding rollers 14, protrudes a little bit through each window hole 15.

At an inside surface of each of the side plates 7A, 7B, there is provided a bracket 16. On the bracket 16, there is provided a paper feeding roller 17 supported so as to be freely rotatable. The paper feeding roller 17 and the paper feeding roller 14 press against each other, with the paper feeding roller 17 driven by the paper feeding roller 14. That is, the driving motor 11 rotates the paper feeding roller 14 so as to convey a cutting medium 1, which is sandwiched and pressed between the paper feeding roller 14 and the paper feeding roller 17, in a Y-direction.

On an outer side surface of the side plate 7A, there is provided a bracket 18A, which extends in a horizontal direction. In the same way, on an outer side surface of the side plate 7B, there is provided a bracket 18B, which extends in a horizontal direction. On the bracket 18A, a driving pulley 19 is supported to be freely rotatable, and on the bracket 18B, a driven pulley 20 is supported to be freely rotatable. The driving pulley 19 is actuated to rotate by the driving motor 21 which is installed on the bracket 18A. The driving pulley 19 and the driven pulley 20 are wound by a timing belt 22 so as to rotate in synchronization with each other. Furthermore, a cutting head 23 is fixed on the timing belt 22. The timing belt 22 is driven by the driving motor 10, thus, the cutting head 23 is shifted in an X-direction. Moreover, there is provided a guide shaft 24 hung between upper portions of the side plates 7A, 7B. This guide shaft 24 is inserted into an opening 25 formed on an upper portion of the cutting head 23, therefore, the guide shaft 24 guides the shift of the cutting head 23 along X-direction.

Figure 3:
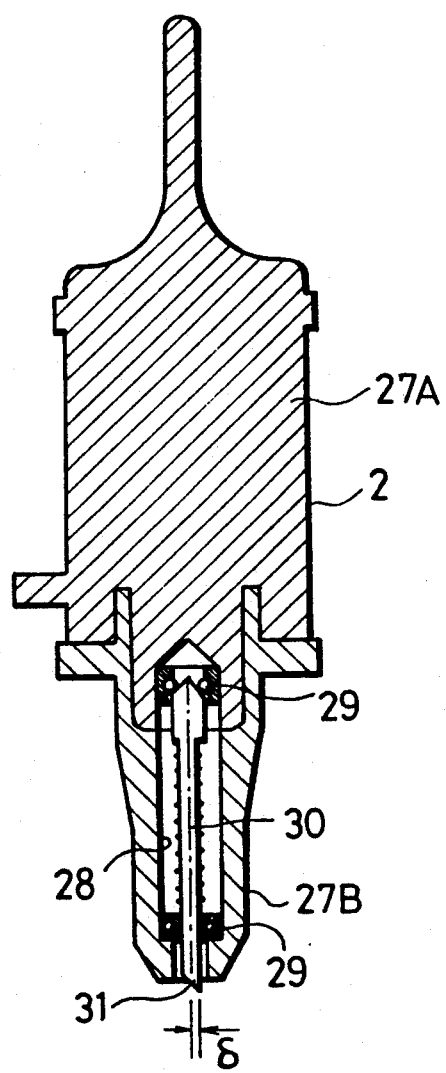
FIG. 3 is a cross-sectional elevation view showing a cutter shown in FIG. 2.

A detailed structure of a cutter member 2, housed and supported inside the cutting head 23, is shown in FIG. 3.

Figure 2B:
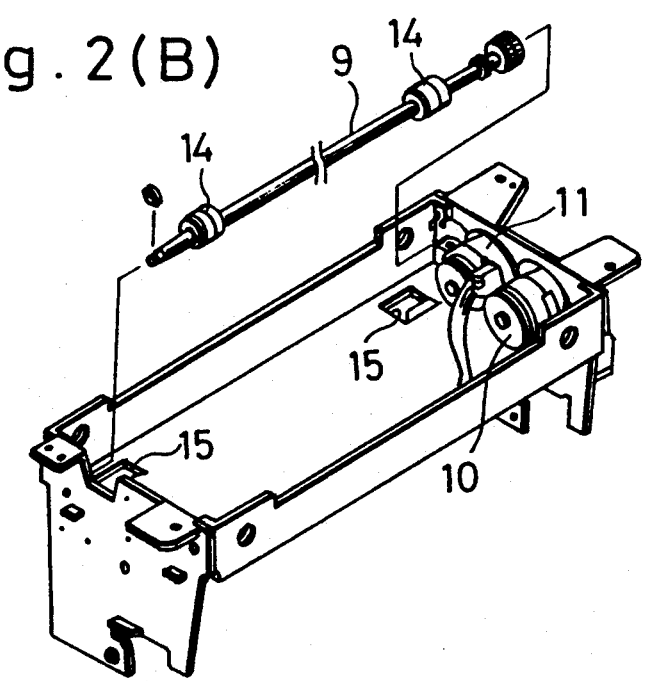

In a room 26 (FIG. 2) of the cutting head 23, a cutter member 2, which is shown in FIG. 3, is disposed to be movable in an up-and-down direction. The cutter member 2 is constituted of an upper half portion 27A and a lower half portion 27B which are mutually coupled to each other. In the lower half portion 27B, there is provided a central bore 28 which extends upward. In the central bore 28, there are provided a pair of bearings 29, 29 spaced among each other in the up-and-down direction. These pair of bearings 29, 29 support a long column-shaped cutter 30. This long column-shaped cutter 30 is disposed in such a manner that the lower end of the cutter 30 is disposed outside the central bore 28. The lower outer end portion of the cutter 30 is formed in a form of cutting edge portion by cutting off the lower outer end of the cutter 30.

A pointed end of the cutting edge portion 31 is offset from a rotational axis, extending in a vertical direction of the cutter 30 by an offset amount $\delta$. By virtue of this offset arrangement of the pointed end of the cutting edge portion, a rotational moment is given from the cutting medium 1 to the cutter 30 through the pointed end of the cutting edge portion 31. Thus, the cutting edge portion 31 of the cutter 30 is always forced to face the predetermined cutting direction.

Figure 4:
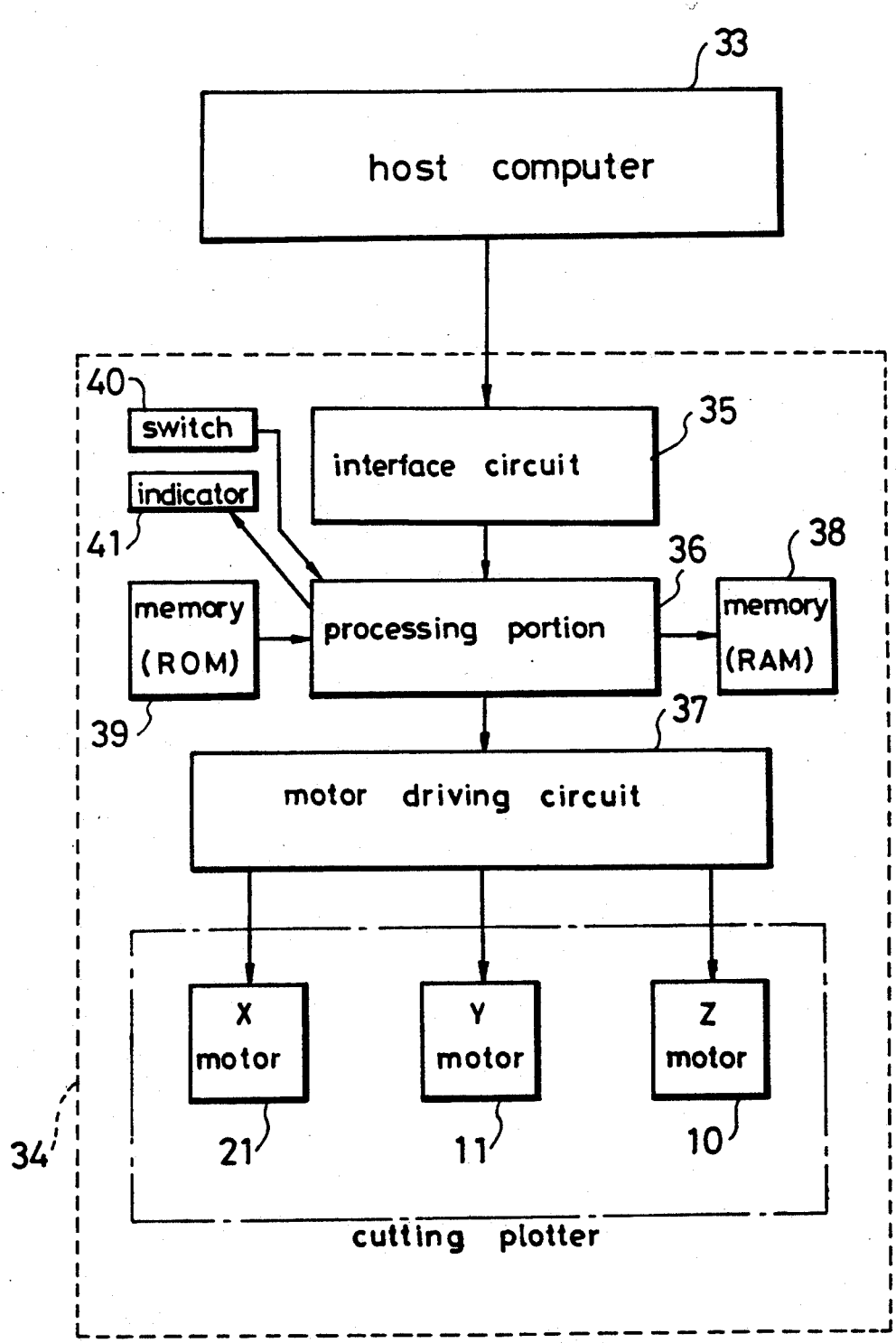
FIG. 4 is a block diagram illustrating a control system of the embodiment in accordance with the present invention.
Figure 5:
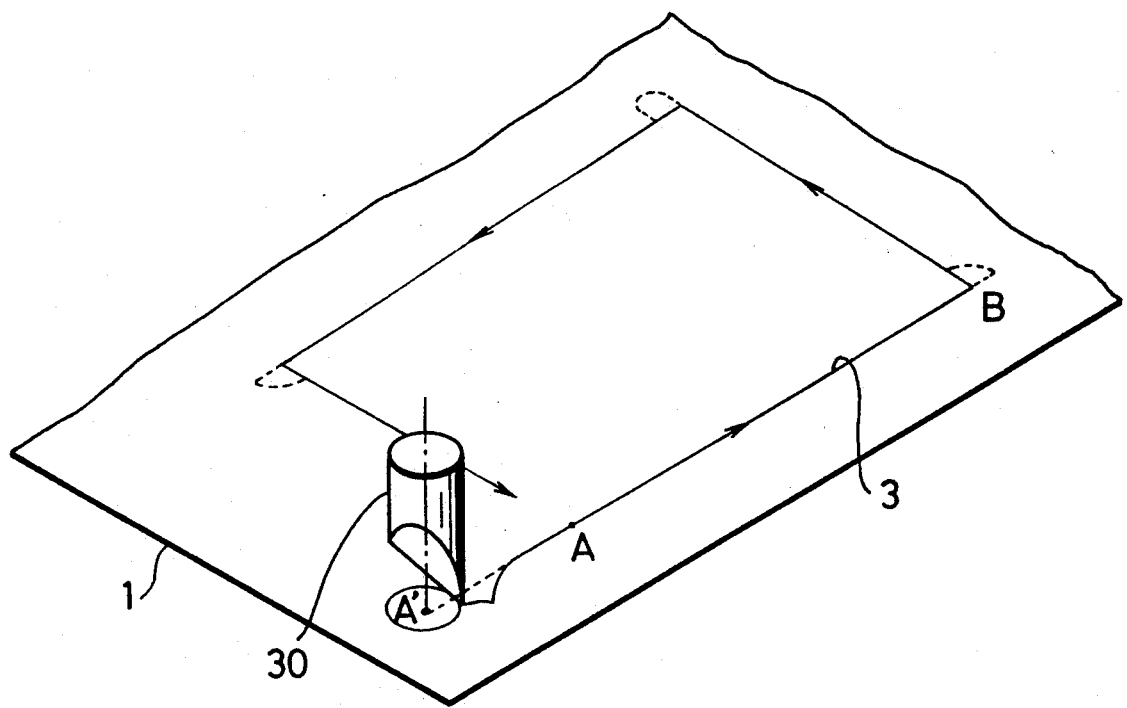
FIG. 5 is a perspective view showing an operation of an angular initialization method for orientating a direction of a cutting edge portion in a cutting plotter in accordance with a conventional method.

FIG. 4 shows a control system for carrying out the cutting operation in accordance with the present invention. A host computer 33 memorizes various cutting data for cutting out the cutting medium 1 into a desired shape 3, such as a figure and a letter. These cutting data are inputted from the host computer 33 to a processing portion 36 through an interface circuit 35. The processing portion 36 and the interface circuit 35 are provided in a cutting plotter 34. The processing portion 36 is provided for processing the cutting data fed from the host computer 33, and the processing portion 33 is connected with a motor driving circuit 37. When the processing portion 36 has produced a motor driving signal through its arithmetic operation, the motor driving signal is fed to the motor driving circuit 37 so as to actuate the driving motors. The host computer 33 outputs, at a predetermined timing which is described later, cutting data for initializing the direction of the cutting edge portion 31 of the cutter 30.

The processing portion 36 is connected with a RAM (Random Access Memory) 38 for temporarily memorizing cutting data, and a ROM (Read Only Memory) 39 for storing rotational step numbers of the driving motor 10 in a form of a table, wherein the rotational step numbers are determined so as to correspond to cutter pressures. Moreover, the processing portion 36 is connected with a switch 40 for setting a cutter pressure, which is disposed on an operational panel of the plotter main body (not shown), and an indicator 41 for indicating rank of a cutter pressure.

The motor driving circuit 37 is connected with each of the driving motor 10, the driving motor 11, and the driving motor 21. Thus, the driving motor 10, the driving motor 11, and the driving motor 21 are actuated to rotate at a predetermined timing in accordance with the cutting data fed from the host computer 33. Based on an input signal of cutter pressure given by the switch 40, a corresponding step number is read out from the ROM 39 and the cutter main body 30 is pressed against the cutting medium 1 by a desired cutting pressure. Moreover, the timings at which the cutter main body 30 is pressed against the cutting medium 1 and at which the cutter main body 30 is released from the cutting main body 1 are determined and controlled, based on the cutting data fed from the host computer 33.

Next, the operation of the embodiment of the present invention which is constituted as described in the foregoing description, is explained hereinafter.

The actuation and stoppage control for each of the driving motor 10, the driving motor 11, and the driving motor 21 is carried out through the processing portion 36 and the motor driving circuit 37 based on the cutting data supplied from the host computer 33. The cutter pressure control for determining the cutter pressure given to the cutting medium 1 by the cutter 30 of the cutter 2, is carried out through the switch 40 so as to input a rank of the cutter pressure.

Further, the shift operation of the cutting head 23 in the X-direction is carried out through the timing belt 22 by actuating the driving motor 21 in a clockwise direction or a counterclockwise direction. Moreover, the shift operation of the cutting medium 1 in the Y-direction is carried out in such a manner that the rotational shaft 9 is rotated by actuating the driving motor 11 in a clockwise direction or a counterclockwise direction, thus the paper feeding rollers 14, which are rigidly coupled on the rotational shaft 9 are rotated to feed the cutting medium 1 in cooperation with the paper feeding roller 17, which are pressed against the paper feeding roller 14, so as to securely grab the cutting medium 1 between the paper feeding rollers 14, and the paper feeding rollers 17, while the cutting medium 1 is conveyed along the direction of Y.

Furthermore, shift operation of the cutter member 2 in a Z-direction, including an adjustment of cutter pressure, is carried out by the driving motor 10 through an appropriate mechanism (not shown).

It should be noted that, shortly after an electrical power source is turned on, or when a previous cutting data is not available, it is not known which direction the cutting edge portion 31, of the cutter 30, is facing since the cutter 30 is supported to be freely rotatable around its rotational axis. Further, when the cutting edge portion 31 points to the direction opposite to the cutting direction, it is feared that the cutting operation will fail due to the undesirable dislocation of the cutting edge portion 31 of the cutter 30.

However, in the embodiment of the present invention, in the case when the previous cutting data is not available, for example, as described in the foregoing description, shortly after the electric power source is turned on, or when the cutting operation is carried out for the first time, the angular initialization for orientating in a predetermined direction the cutting edge portion 31 of the cutter 30, provides a guaranteed and stabilized cutting operation from the beginning.

Figure 1:
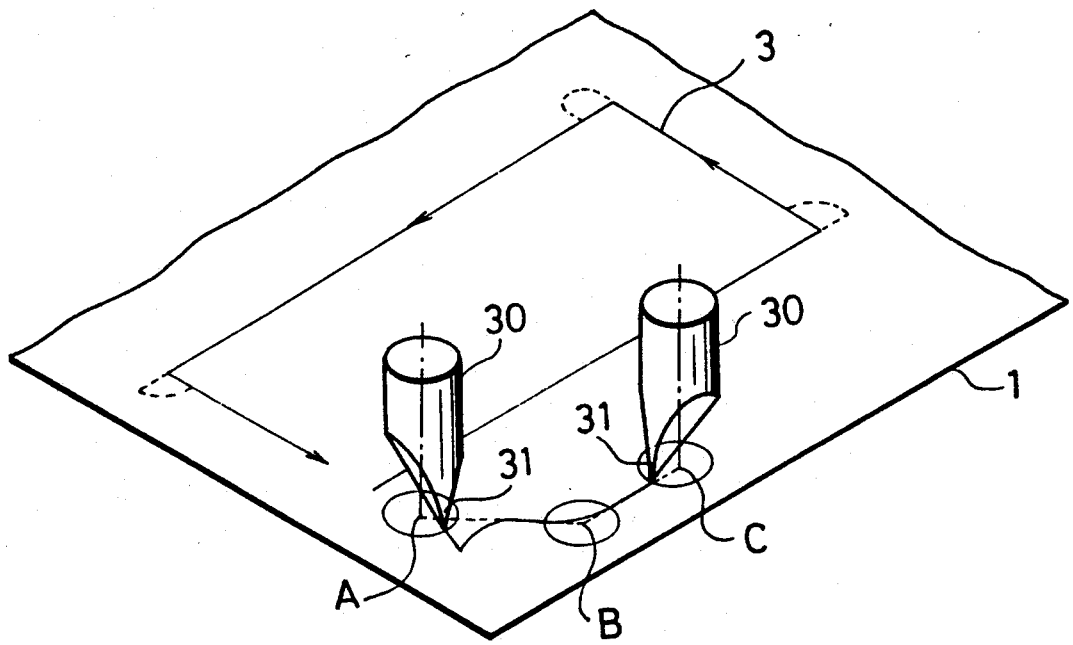

The angular initialization of the cutting edge portion 31 is carried out by outputting the cutting data prepared for this angular initialization from the host computer 33 to the processing portion 36. The cutting data for the angular initialization of the cutting edge portion 31 is, as shown in FIG. 1, the data consisted of two line segments AB and BC, which are connected with each other so as to intersect at a predetermined angle and are disposed out of the shape, such as a letter or figure, to be cut out in the cutting operation. It is desirable that the line segment AB and the line segment BC are respectively long enough to be more than two times of the offset amount $\delta$ of the pointed end of the cutting edge 31 from its rotational axis. Further, it is desirable to choose the point A of the line segment AB as an origin in the X-Y coordinates, since the arithmetic calculation becomes easy.

A preliminary cutting operation for performing the angular initialization, based on the above-described cutting data is carried out in such a manner that, first of all, the cutter member 2 is lowered at the point A, and the pointed end of the cutting end portion 31 is pressed on the cutting medium 1. Further, the driving motor 11, the driving motor 21 are actuated to shift the cutter member 2 in the horizontal direction so as to cut the cutting medium 1 along the line segment AB and the line segment BC continuously, and, when the cutting operation for obtaining the shape 3 is completed, the cutter member 2 is raised and returns to the position of point A. Then, the direction of the cutting edge portion 31 of the cutter 30, which corresponds to the direction of the line segment BC, is memorized in the RAM 38. The data memorized in the RAM 38 is renewed upon the end of each cutting operation, the next cutting operation is carried out by referring to this previous cutting data to obtain the desired shape 3 accurately.

In accordance with the embodiment of the present invention, the preliminary cutting operation is performed, in which a pair of line segments AB and BC are utilized as the cutting data for the angular initialization of the cutting edge portion 31 of the cutter 30 so that the cutting edge portion 31 of the cutter 30 is accurately located to point to the predetermined direction. When the cutter member 2 is shifted along the line segment AB, if the cutting edge portion 31 of the cutter 30 faces, for example, toward exactly an opposite direction of the desirable cutting direction, it is feared that the cutter 30 cannot rotate to return to the desired direction. However, even if the direction of the cutting edge portion 31 of the cutter 30 could not return to the desired direction while the cutter 30 is shifting along the first line segment AB, then as the cutter 30 is shifted along the line segment BC, it surely becomes possible to change the direction of the cutting edge portion 31 of the cutter 30 to the desired predetermined cutting direction. Because, since the line segmen AB and the line segment BC intersect with each other at a certain angle, the cutter 30 can never maintain the exact opposite direction of the desired cutting direction when it is shifted from the line segment AB to the line segment BC. Accordingly, the rotational moment around the cutter 30 is generated, and the cutter gradually changes its direction so as to coincide with the direction of the line segment BC. Then, the direction of the line segment BC can be utilized as information of the present direction of the cutting edge portion 31 of the cutter 30 which stands by for the next cutting operation. Consequently, the cutting operation of the cutting medium 1 can be accurately carried out and stabilized.

The illustrated locus in FIG. 1 shows one example, in which the locus of the pointed end of the cutting edge portion 31 of the cutter 30 does not coincide with the shifting direction being indicated by a broken line in the drawing at the beginning of the preliminary cutting operation, that is, when the cutter 30 is shifting on the line segment AB, the pointed end of the cutting edge portion 31 departs from the line segment AB so as to depict a mountain-shaped locus. However, the direction of the cutting edge portion 31 is changed to coincide with the direction of the line segment AB at the midway of the shifting movement of the cutter 30 along the line segment AB.

The present invention is not limited in the foregoing embodiment, therefore, various modifications and changes are possible if required.

As this invention may be embodied in several forms without departing from the spirit of essential characteristics thereof, the present embodiment is only illustrative and not restrictive, since the scope of the invention is defined by the appending claims rather than by the description preceding them, and all changes that fall within metes and bounds of the claims, or equivalents of such metes and bounds, are therefore intended to be embraced by the claims.

As is explained in the foregoing description, the angular initialization method for orientating the direction of the cutting edge portion in the cutting plotter, in accordance with the present invention, enables it to accurately locate the direction of the cutter edge portion to coincide with the predetermined direction desirable for the cutting operation shortly before the cutting operation is commenced, thereby realizing practical effect such that the cutting medium is always cut accurately and the cutting operation is stabilized.

What is claimed is:

1. An angular initialization method for orientating a direction of a cutting edge portion in a cutting plotter wherein a cutter member comprising a cutter with a cutting edge portion supported to be freely rotatable and a pointed end thereof is disposed offset from a rotational axis of the cutter, is shifted along an X-direction or a Y-direction in an X-Y coordinates defined in a mutual relationship with respect to a cutting medium so as to cut out a desired shape from the cutting medium, the method comprising the steps of:

setting first and second line segments, which are connected to intersect with each other at a predetermined angle and are located out of the desired shape on the cutting medium said second line segment pointing in a predetermined cutting direction; and shifting the cutter member along the first and second line segments to cut the cutting medium, thereby initializing a direction of the cutting edge portion to coincide with the predetermined cutting direction.

2. An angular initialization method in accordance with claim 1 in which said step of shifting the cutting member along the first and second line segments is done in a continuous manner.

3. An angular initialization method in accordance with claim 1 in which, when said offset of the pointed end of the cutting edge portion is defined to be a value δ, said first and second line segments each have lengths greater than two times of the value δ.

4. An angular initialization method for orientating a direction of a cutting edge portion in a cutting plotter to correspond with a predetermined cutting direction comprising the steps:

pressing a cutter member against a cutting medium;

shifting the cutter member along a first line segment to cut the cutting medium, and then shifting the cutter member along a second line segment which is pointing in the predetermined cutting direction to cut the cutting medium, said second line segment intersecting with the first line segment at a predetermined angle, said first and second line segments disposed outside a shape to be cut out; and releasing the cutting member from the cutting medium after the shifting steps are completed.

* * * * *